United States Patent
Reese et al.

(10) Patent No.: US 6,259,756 B1
(45) Date of Patent: Jul. 10, 2001

(54) CONTROL BLADE SEQUENCE PATTERNS FOR OPTIMIZATION OF BWR POWER CONTROL

(75) Inventors: Anthony Paul Reese; Harold Hartney Yeager, both of Wilmington, NC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/642,929

(22) Filed: Aug. 22, 2000

(51) Int. Cl.[7] .................................................. G21C 7/08
(52) U.S. Cl. ............................................................. 376/237
(58) Field of Search .................................. 376/236, 237, 376/241

(56) References Cited

U.S. PATENT DOCUMENTS

| | | | |
|---|---|---|---|
| 3,385,758 | * | 5/1968 | Gyorey et al. ......................... 376/237 |
| 4,285,769 | * | 8/1981 | Specker et al. ....................... 376/237 |
| 4,368,171 | * | 1/1983 | Maruyama et al. ................... 376/236 |
| 5,217,678 | * | 6/1993 | Fukasawa ............................. 376/237 |

* cited by examiner

*Primary Examiner*—Harvey E. Behrend
(74) *Attorney, Agent, or Firm*—Nixon & Vanderhye

(57) ABSTRACT

In a nuclear reactor core, control blades form discrete control blade groups forming a core pattern including first and second main groups, respectively, symmetrically and asymmetrically arranged about the core. Each main group has first and second sub-groups, each sub-group at each control blade location within the core being located alternately in orthogonally-related X and Y directions in plan view of the core. The first sub-group of the first main group includes an operational sub-group. The blades of the first and second main groups are used simultaneously. The blades of the second main group are used only as shallow blades. The blades of the first main group are movable into deep or shallow positions from withdrawn positions. Each fuel bundle operates without an adjacent control blade for a time period twice as long as any previous period of operation with an adjacent control blade inserted into the core. Any one control blade is fully withdrawn for two consecutive periods after insertion. The pattern repeats after three or more periods.

18 Claims, 2 Drawing Sheets

CONTROL BLADE SEQUENCE PATTERNS FOR OPTIMIZATION OF BWR POWER CONTROL

BACKGROUND OF THE INVENTION

The present invention relates to a method of operating a boiling water nuclear reactor and particularly relates to a control blade sequence pattern to optimize the BWR power control and hence obtain greater power and/or improved uranium fuel efficiency and economy.

Control blades typically containing boron carbide provide reactivity control, i.e., control the total reactive power and power distribution. The control blades are generally in cruciform cross-section and are inserted between four associated fuel bundles or assemblies containing arrays of fuel rods. The blades enter the bottom of the reactor core and are movable into positions within the reactor core for reactivity control and positions withdrawn from the core. In modern BWRs, control blades are divided into two groups, generally known as "A sequence" and "B sequence." The control blades of the A sequence and the B sequence are referred to herein respectively as A or B control blades or A or B sequence blades. These two groups generally form a checkerboard pattern throughout and in plan view of the reactor core. An A control blade is conventionally at the center of the core. Thus, every other control blade in a first direction, i.e., an X direction, from the center of the core is an A sequence blade and every other blade in a Y direction, i.e., a second direction normal to the first direction, from the center of the core is an A sequence blade. Alternate blades in the X and Y directions between the A sequence blades are B sequence blades. With this typical arrangement, the A sequence blades are symmetric relative to the center of the core, while the B sequence blades are asymmetric.

Control blades are also designated as deep or shallow inserted blades. Blades whose tips are inserted more than two-thirds into the core are referred to as deep blades, while those inserted less than one-third into the core are referred to as shallow blades. Deep blades are used to control total reactive power as well as the global radial power shape. Shallow blades are used to control the reactor axial power shape. Generally, blades are not inserted into the middle third of the core because they tend to create axial power distribution problems. Control blades are, of course, movable to the deep and shallow positions from positions totally withdrawn from the core.

In conventional BWR operations, four basic control blade patterns, the control blades of which are designated at A1, A2, B1 and B2, are used to develop operating control blade pattern sequences throughout each cycle. The typical practice is to alternate use of two blade sequences during operation of the reactor. Each sequence of blades, for example, the A sequence, is used exclusively of the other sequence, e.g., the B sequence. Thus, only A sequence or B sequence blades, but not both, are inserted into the core at any given time. The non-inserted blades are disposed in withdrawn positions. The blades are moved in and out relative to the core on a scheduled basis to avoid power distribution difficulties within the fuel bundles.

When employing this operational practice, the asymmetry associated with B sequence blades, however, causes the power distribution within the reactor to become asymmetric and more highly peaked to various locations, i.e., the radial power shape of the core tends to be skewed toward one corner or another corner, i.e., non-symmetric. This asymmetric peaking must be accommodated and reduced by design of the reactor fuel loading, necessarily reducing fuel efficiency. Problems associated with the B sequence blade asymmetry, however, have been partly alleviated through the use of control cell core (CCC) loading patterns. With the CCC design, low reactivity fuel assemblies are placed in the control cells so that control rod motion occurs adjacent only relatively low-power fuel. That is, CCC loading schemes place relatively low power fuel bundles around A sequence blades, only some of which are used for power control. Fresh fuel bundles which have higher power must not be loaded next to these blades because the blades must be inserted for longer periods. With the CCC design, those certain A sequence control blades located in the low-power control cells are utilized for reactivity and power distribution control purposes throughout the entire cycle.

CCC loading, however, has limitations and drawbacks. As reactors are operated for long periods of time between refueling cycles, the number of fresh bundles inserted each cycle increases. When the fresh batch fraction is larger than 40%, the CCC loading becomes difficult and inefficient. Moreover, longer control periods associated with the use of CCC designs may contribute to a type of fuel failure associated with power peaking with the bundles. Accordingly, there is a need for a control blade sequencing pattern which avoids the asymmetry problem associated with the B sequence blades but does not require that the reactor fuel loading be limited as in the CCC design.

BRIEF SUMMARY OF THE INVENTION

In accordance with a preferred embodiment of the present invention, the blades of each of the A and B blade sequences, i.e., main blade groups A and B, are respectively divided into blade sub-groups, referred to as A1 and A2 and B1 and B2 blades. With a control blade A2 at the center of the core, every other control blade location in the core in the X and Y directions is an A2 blade. The first and second sub-groups of each main group are flanked by first and second sub-groups, respectively, of the other main group in the X direction. For example, the first and second sub-groups A1 and A2 of main group A are flanked by first and second sub-groups B1 and B2, respectively, of the main group B in the X direction, while the first and second sub-groups B1 and B2 of main group B are flanked by first and second sub-groups A1 and A2, respectively, in the X direction. The first and second sub-groups of each main group are flanked by second and first sub-groups, respectively, of the other main group in the Y direction. Thus, first and second sub-groups A1 and A2 of main group B are flanked by second and first sub-groups B2 and B1, respectively, in the Y direction, while the first and second sub-groups B1 and B2 of main group B are flanked by second and first sub-groups A2 and A1, respectively, in the Y direction. Thus, A1 and A2 control blades are symmetric relative to the center point of the core, whereas the B1 and B2 blades are asymmetric.

In accordance with a preferred embodiment of the present invention and contrary to prior practice, selected A and B control blades are inserted into the core at the same time but with the B sequence blades used only as shallow blades and the A sequence blades used as either deep or shallow blades. That is, the B sequence blades are movable only between positions withdrawn from the core and shallow positions within the core. The A sequence blades, however, are movable between withdrawn, deep or shallow positions. Further, the operating sequence is such to allow each fuel bundle a period of operation with its associated control blade withdrawn that is at least twice as long as the previous period of operation with the associated control blade inserted. The pattern repeats itself every three or more consecutive time periods and any one blade is fully withdrawn from the core for at least two consecutive time periods after it has been inserted enabling operation of the associated fuel assembly in an uncontrolled state for those two consecutive periods. That is, a different one of control blades A1 or A2 are inserted from a withdrawn position into a deep position at the beginning of each of at least three successive time periods, while a different one of the control blades A1, A2, B1 or B2 is inserted into a shallow position at the beginning of each such successive time period. Thus, selected non-inserted blades are maintained in withdrawn positions at the beginning of each such successive time period for at least two consecutive time periods.

In a preferred embodiment according to the present invention, there is provided in a nuclear reactor having a core, the core including plural control blades and fuel assemblies with each control blade operationally associated with four fuel bundles of each fuel assembly, sets of the control blades forming discrete control blade groups forming a core pattern including first and second main groups thereof, respectively, symmetrically and asymmetrically arranged about the core, each main group having first and second sub-groups, the first sub-groups of the main group including first and second operational sub-groups, respectively, of control blades, each first sub-group of the first main group being flanked by first sub-groups of the second main group in a first direction and by the second sub-group of the second main group in a second direction normal to the first direction, each second sub-group of the first main group being flanked by second sub-groups of the second main group in the first direction and by first sub-groups of the second main group in the second direction, each first sub-group of the second main group being flanked by a first sub-group of the first main group in the first direction and by the second sub-group of the first main group in the second direction, each second sub-group of the second main group being flanked by a second sub-group of the first main group in the first direction and by the first sub-group of the first main group in the second direction, each blade of each first main group being movable between withdrawn, deep and shallow positions relative to the core and the fuel bundles associated with the first main group, each blade of each second main group being movable between withdrawn and shallow positions relative to the core and to fuel bundles associated with the second main group, a method of operating the nuclear reactor comprising the steps of inserting into the core from a withdrawn position into a deep position a different sub-group of the blades of the first and second sub-groups and operational sub-groups of the first main group at the beginning of at least each of three successive time periods, respectively, with predetermined sub-groups of blades of the first and second main groups withdrawn from the core at the beginning of each successive time period, inserting into the core from a withdrawn position into a shallow position a different sub-group of the blades of the first and second sub-groups of the first and second main groups at the beginning of each of the successive time periods with the predetermined sub-groups of blades of the irst and second main groups withdrawn from the core at the beginning if each successive time period and maintaining selected sub-groups of the withdrawn blades at the beginning of each successive time period in a withdrawn position for at least two consecutive time periods.

In a further preferred embodiment according to the present invention, there is provided in a nuclear reactor having a core, the core including plural control blades and fuel assemblies with each control blade operationally associated with four fuel bundles of each fuel assembly, sets of the control blades forming discrete control blade groups forming a core pattern including first and second main groups thereof, respectively, symmetrically and asymmetrically arranged about the core, each main group having first and second sub-groups, each sub-group at each control blade location within the core being located alternately in both orthogonally-related X and Y directions in plan view of the core, the first sub-group of the first main group including an operational sub-group, a method of operating the nuclear reactor comprising the steps of inserting into the core from a withdrawn position into a deep position different selected blades of the first and second sub-groups of the first main group at the beginning of at least each of three successive time periods, respectively, with predetermined sub-groups of blades of the first and second main groups withdrawn from the core at the beginning of each successive time period, inserting into the core from a withdrawn position into a shallow position different selected blades of the first and second sub-groups of the first and second main groups at the beginning of each of the successive time periods with the predetermined sub-groups of blades of the first and second main groups withdrawn from the core at the beginning if each successive time period and maintaining selected withdrawn blades at the beginning of each successive time period in a withdrawn position for at least two consecutive time periods.

DETAILED DESCRIPTION OF THE INVENTION

Figure 1:
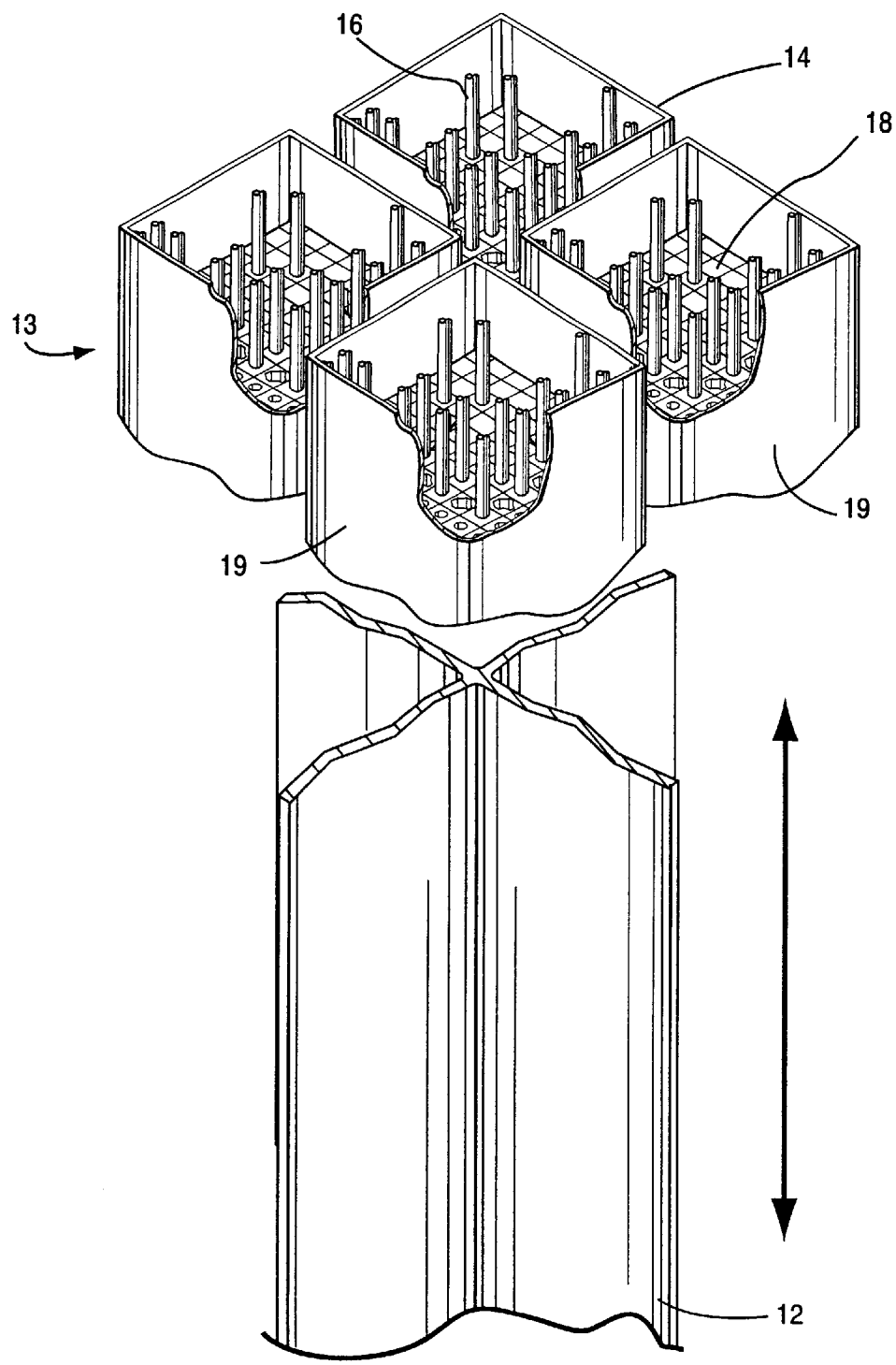
FIG. 1 is a perspective view of a control rod and four fuel bundles with the control rod aligned with the cruciform openings between the fuel bundles.
Figure 2:
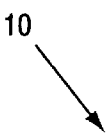
FIG. 2 is a schematic plan view of a typical BWR control blade configuration in a boiling water nuclear reactor core.

Referring now to the drawing, there is schematically illustrated in FIG. 2 a nuclear reactor core, generally designated 10, with a control blade pattern indicated by the square boxes disposed in the core 10. Each box of FIG. 2 represents a control blade 12 and an associated fuel assembly, generally designated 13, comprised of four fuel bundles 14 as illustrated in FIG. 1. The fuel bundles 14 are only partially illustrated with each bundle having fuel rods 16, e.g., in a 10×10 array, and associated vertically spaced spacers 18 as is conventional, only one spacer 18 being illustrated in each fuel bundle 14. Fuel channels 19 surround each fuel bundle 14 and define a cruciform opening between the fuel assemblies. As will be appreciated, each control blade 12 is cruciform in cross-section and is generally receivable within the core of the nuclear reactor in the cruciform openings between the four fuel bundles 14, the blades being movable from below the fuel assemblies, i.e., withdrawn positions, to positions within the cruciform openings adjacent the fuel assemblies. Hence, each box illustrated in FIG. 2 and represented by any one of the control blades A1, A2, B1 and B2 includes a single control blade 12 and four associated fuel bundles 14 arranged in quadrants defined by the cruciform spaces therebetween.

Control blade sequences are generally divided into two groups known as A sequence blades and B sequence blades. Thus, the A and B control blades constitute first and second main groups A and B, respectively, of control blades. The first and second main groups A and B form a checkerboard pattern throughout the core as illustrated in the plan view of the core of FIG. 2. From a review of FIG. 2, it will be appreciated that the first main group of blades A is symmetric relative to the center of the core. The second main group of control blades B is asymmetric relative to the core. It will also be appreciated from a review of FIG. 2 that the respective main groups of blades A and B are each further divided into two sub-groups. For example, main group A is divided into sub-groups A1 and A2. Main group B is divided into sub-groups B1 and B2. A control blade of the sub-group A2 always lies at the center of the core.

From a detailed review of FIG. 2, each first sub-group A1 of the first main group A is flanked by sub-groups B1 of the second main group B in a first or X direction. Each sub-group A1 of the first main group A is also flanked by second sub-groups B2 of the second main group B in a second or Y direction normal to said first or X direction. Also, each sub-group A2 of the first main group A is flanked by second sub-groups 82 of the second main group B in the first or X direction. Each second sub-group A2 of first main group A is also flanked by first sub-groups B1 of the second main group B in the second or Y direction. Similarly, each sub-group B1 of the second main group B is flanked by a sub-group A1 of the first main group A in the first or X direction. Each sub-group B1 of the second main group B is also flanked by the second sub-group A2 of the first main group A in the second or Y direction. Finally, each second sub-group B2 of the second main group B is flanked by a second sub-group A2 of the first main group A in the first or X direction and by the first sub-group A1 of the first main group A in the second or Y direction. Thus, it will be appreciated that each sub-group at any one control blade location within the core is located alternately in both X and Y directions.

In each control cell formed by the single control blade 12 and four associated fuel bundles 14, the control blades 12 are movable from a withdrawn position below the core to either a shallow position or a deep position or both, depending upon their status as sequence A or B blades. The movement of the control blades relative to the fuel assemblies is indicated by the double-ended arrow in FIG. 1. Blades whose tips are inserted more than two-thirds into the core are referred to as deep blades. Blades inserted less than one-third into the core are referred to as shallow inserted blades. Deep blades are used to control the total reactor power, as well as the global radial power shape. Shallow blades are used to control the reactor axial power shape. Generally, blades are not inserted into the middle third of the core because they would tend to create axial power distribution problems.

In accordance with a preferred embodiment of the present invention, and instead of using the first and second main groups A and B, respectively, of blades alternately as in the prior art, the first and second main groups A and B are at times employed simultaneously with the second main group B only used as shallow blades and the first main group A used either as deep or shallow blades. Moreover, the sequences are constructed to enable each fuel bundle a period of operation in an uncontrolled state without its associated control blade that is at least twice as long as the previous period of operation in a controlled state with its associated blade. That is, each fuel bundle is operated with its associated control rod withdrawn from the core for a period of time at least twice as long as the previous period of operation with its associated control rod inserted into the core. Additionally, each sub-group A1 and A2 of the first main group includes operational sub-groups A1' and A2', respectively. Consonant with a preferred embodiment of this invention, the sequence pattern for control of the core repeats at least every three consecutive time periods and any one blade is fully withdrawn for at least two consecutive periods after it has been inserted. With these criteria, there are a number of possibilities for control blade sequence patterns to optimize the BWR power control. For example, a control blade sequence pattern is illustrated in the chart below.

CHART I

| Time Period | Deep Blades | Shallow Blades | Not Used (Withdrawn) |
|---|---|---|---|
| 1 | A1 | A1' | A2, A2', B1, B2 |
| 2 | A2 | B2 | A1, A2', B1 |
| 3 | A2' | B1 | A1, A2, B2 |
| 4 | A1 | A1' | A2, A2' B1, B2 |
| 5 | A2 | B2 | A1, A2', B1 |
| 6 | A2' | B1 | A1, A2, B2 |
| 7 | A1 | A1' | A2, A2', B1, B2 |
| 8 | A2 | B2 | A1, A2', B1 |
| 9 | A2' | B1 | A1, A2, B2 |

As can be seen from Chart I, during the first time period, the first sub-groups A1 of the first main group A have their control blades inserted as deep blades. The first operational sub-groups A1' of the first sub-groups A1 have their blades inserted to shallow depths. The remaining blades of sub-groups A2, A2', B1 and B2 are totally withdrawn and not inserted.

At the end of the first time period of reactor operation, the blades of A1 and first operational sub-group A1' are withdrawn, while the second sub-groups A2 of the first main group A are inserted into the core as deep blades. The blades of the second sub-groups B2 of the second main group B are also inserted into the core as shallow blades. The remaining blades of sub-groups A1 and B1 and operational sub-groups A2' are or remain withdrawn as applicable. The reactor is then operated for the predetermined time period 2.

At the end of the second time period of reactor operation, the blades of the operational sub-groups A2' are inserted into deep positions, while the blades of the sub-groups B1 are inserted into shallow positions. The remaining blades of sub-groups A1, A2 and B2 are either withdrawn or remain withdrawn as applicable. The reactor is then operated for the third predetermined time period.

At the end of the third time period, the preferred pattern preferably repeats itself, although it will be appreciated that the pattern may extend to periods beyond three consecutive time periods before repeat. Note that with this pattern, each fuel bundle is operational in an uncontrolled state without insertion of its associated control blade for at least two consecutive time periods before the associated control blade is inserted. Stated differently, any one control blade is fully withdrawn for at least two consecutive time periods after it has been inserted. Moreover, it will be appreciated that the control blades of the second main group B are used only as shallow blades, not as deep blades, and are movable only between positions withdrawn or into shallow positions apart from a scram condition. It will be appreciated that other sequences of operation of the control blades using the criteria stated above may be used.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a nuclear reactor having a core, said core including plural control blades and fuel assemblies with each control blade operationally associated with four fuel bundles of each fuel assembly, sets of said control blades forming discrete control blade groups forming a core pattern including first and second main groups thereof, respectively, symmetrically and asymmetrically arranged about the core, each main group having first and second sub-groups, said first sub-groups of said main group including first and second operational sub-groups, respectively, of control blades;

each first sub-group of said first main group being flanked by first sub-groups of said second main group in a first direction and by the second sub-group of said second main group in a second direction normal to said first direction;

each second sub-group of said first main group being flanked by second sub-groups of said second main group in said first direction and by first sub-groups of said second main group in the second direction;

each first sub-group of said second main group being flanked by a first sub-group of said first main group in the first direction and by said second sub-group of said first main group in the second direction;

each second sub-group of said second main group being flanked by a second sub-group of said first main group in the first direction and by the first sub-group of said first main group in the second direction;

each blade of each first main group being movable between withdrawn, deep and shallow positions relative to said core and said fuel bundles associated with said first main group, each blade of each second main group being movable between withdrawn and shallow positions relative to said core and to fuel bundles associated with said second main group;

a method of operating the nuclear reactor comprising the steps of:

inserting into the core from a withdrawn position into a deep position a different sub-group of the blades of the first and second sub-groups and operational sub-groups of said first main group at the beginning of at least each of three successive time periods, respectively, with predetermined sub-groups of blades of said first and second main groups withdrawn from the core at the beginning of each said successive time period;

inserting into the core from a withdrawn position into a shallow position a different sub-group of the blades of the first and second sub-groups of said first and second main groups at the beginning of each of said successive time periods with said predetermined sub-groups of blades of said first and second main groups withdrawn from the core at the beginning if each said successive time period; and maintaining selected sub-groups of said withdrawn blades at the beginning of each successive time period in a withdrawn position for at least two consecutive time periods.

2. A method according to claim 1 wherein any one control blade of said plural control blades remains withdrawn for at least two consecutive time periods after having been withdrawn from an inserted position.

3. A method according to claim 1, including the further steps of inserting into the core from a withdrawn position into a deep position said first sub-groups of control blades of said first main group at the beginning of a predetermined time period, withdrawing said first sub-groups of control blades of said first main group at the end of said predetermined time period, and maintaining said first sub-groups of said control blades of said first main group withdrawn from said core for at least two consecutive time periods immediately subsequent to said predetermined time period.

4. A method according to claim 3 including the further steps of inserting into said core from a withdrawn position into a shallow position the first operational sub-groups of said first sub-group of said first main group at the beginning of said predetermined time period, withdrawing said first operational sub-groups of said first sub-group of said first main group at the end of said predetermined time period and maintaining said first operational sub-groups of said first sub-group of said first main group withdrawn from said core for at least two consecutive time periods immediately subsequent to said predetermined time period.

5. A method according to claim 4 wherein any one control blade of said plural control blades remains withdrawn for at least two consecutive time periods after having been withdrawn from an inserted position.

6. A method according to claim 1, including the further steps of inserting into the core from a withdrawn position into a shallow position the second sub-group of said second main group of control blades at the beginning of a predetermined time period and maintaining said second sub-groups of said second main group of control blades withdrawn from said core for at least two consecutive time periods, immediately subsequent to said predetermined time period.

7. A method according to claim 1, including the further steps of inserting into the core from a withdrawn position into a deep position the operational sub-groups of said second sub-group of said first main group of control blades at the beginning of a predetermined time period, withdrawing said second operational sub-groups of said second sub-group of said first main group at the end of said predetermined time period and maintaining said second operational sub-groups of said first main group of said control blades withdrawn from said core for at least two consecutive time periods immediately following said predetermined time period.

8. A method according to claim 1, including the further steps of inserting into the core from a withdrawn position into a deep position said second sub-groups of said first main group of control blades at the beginning of a predetermined time period, withdrawing said second sub-groups of said first main group at the end of said predetermined time period and maintaining said second sub-groups of said first main group withdrawn from said core for at least two consecutive time periods immediately subsequent to said predetermined time period.

9. A method according to claim 8 including the further steps of inserting into said core from a withdrawn position into a shallow position the second sub-groups of said second main group of control blades at the beginning of said predetermined time period, withdrawing said second sub-groups of said second main group at the end of said predetermined time period and maintaining said second sub-groups of said second main group withdrawn from said core for at least two consecutive time periods immediately subsequent to said predetermined time period.

10. In a nuclear reactor having a core, said core including plural control blades and fuel assemblies with each control blade operationally associated with four fuel bundles of each fuel assembly, sets of said control blades forming discrete control blade groups forming a core pattern including first and second main groups thereof, respectively, symmetrically and asymmetrically arranged about the core, each main group having first and second sub-groups, each sub-group at each control blade location within the core being located alternately in both orthogonally-related X and Y directions in plan view of the core, said first sub-group of said first main group including an operational sub-group;

a method of operating the nuclear reactor comprising the steps of:

inserting into the core from a withdrawn position into a deep position different selected blades of the first and second sub-groups of said first main group at the beginning of at least each of three successive time periods, respectively, with predetermined sub-groups of blades of said first and second main groups withdrawn from the core at the beginning of each said successive time period;

inserting into the core from a withdrawn position into a shallow position different selected blades of the first and second sub-groups of said first and second main groups at the beginning of each of said successive time periods with said predetermined sub-groups of blades of said first and second main groups withdrawn from the core at the beginning if each said successive time period; and maintaining selected withdrawn blades at the beginning of each said successive time period in a withdrawn position for at least two consecutive time periods.

11. A method according to claim 10 wherein any one control blade of said plural control blades remains withdrawn for at least two consecutive time periods after having been withdrawn from an inserted position.

12. A method according to claim 10, including the further steps of inserting into the core from a withdrawn position into a deep position said first sub-groups of control blades of said first main group at the beginning of a predetermined time period, withdrawing said first sub-groups of control blades of said first main group at the end of said predetermined time period, and maintaining said first sub-groups of said control blades of said first main group withdrawn from said core for at least two consecutive time periods immediately subsequent to said predetermined time period.

13. A method according to claim 12 including the further steps of inserting into said core from a withdrawn position into a shallow position the first operational sub-groups of said first sub-group of said first main group at the beginning of said predetermined time period, withdrawing said first operational sub-groups of said first sub-group of said first main group at the end of said predetermined time period and maintaining said first operational sub-groups of said first sub-group of said first main group withdrawn from said core for at least two consecutive time periods immediately subsequent to said predetermined time period.

14. A method according to claim 13 wherein any one control blade of said plural control blades remains withdrawn for at least two consecutive time periods after having been withdrawn from an inserted position.

15. A method according to claim 10, including the further steps of inserting into the core from a withdrawn position into a shallow position the second sub-group of said second main group of control blades at the beginning of a predetermined time period and maintaining said second sub-groups of said second main group of control blades withdrawn from said core for at least two consecutive time periods, immediately subsequent to said predetermined time period.

16. A method according to claim 10, including the further steps of inserting into the core from a withdrawn position into a deep position the operational sub-groups of said second sub-group of said first main group of control blades at the beginning of a predetermined time period, withdrawing said second operational sub-groups of said second sub-group of said first main group at the end of said predetermined time period and maintaining said second operational sub-groups of said first main group of said control blades withdrawn from said core for at least two consecutive time periods immediately following said predetermined time period.

17. A method according to claim 10, including the further steps of inserting into the core from a withdrawn position into a deep position said second sub-groups of said first main group of control blades at the beginning of a predetermined time period, withdrawing said second sub-groups of said first main group at the end of said predetermined time period and maintaining said second sub-groups of said first main group withdrawn from said core for at least two consecutive time periods immediately subsequent to said predetermined time period.

18. A method according to claim 17 including the further steps of inserting into said core from a withdrawn position into a shallow position the second sub-groups of said second main group of control blades at the beginning of said predetermined time period, withdrawing said second sub-groups of said second main group at the end of said predetermined time period and maintaining said second sub-groups of said second main group withdrawn from said core for at least two consecutive time periods immediately subsequent to said predetermined time period.

* * * * *

UNITED STATES PATENT AND TRADEMARK OFFICE
CERTIFICATE OF CORRECTION

PATENT NO.    : 6,259,756 B1
DATED         : July 10, 2001
INVENTOR(S)   : Reese et al.

It is certified that error appears in the above-identified patent and that said Letters Patent is hereby corrected as shown below:

Column 3,
Line 60, delete "irst" and insert -- first --; and
Line 61, delete "if" and insert -- of --.

Column 4,
Line 25, delete "if" and insert -- of --.

Column 5,
Line 19, delete "82" and insert -- B2 --.

Column 6,
Lines 34-35, delete "At the end of the first time period of reactor operation, the blades of A1 and first operational sub-group A1 ' are withdrawn, while the second sub-groups A2 of the first main group A are inserted into the core as deep blades." and insert -- At the end of the first time period of reactor operation, the blades of sub-groups A1 and first operational sub-group A1' are withdrawn, while the blades of the second sub-groups A2 of the first main group A are inserted into the core as deep blades. --

Column 7,
Line 56, delete "if" and insert -- of --.

Column 9,
Line 27, delete "if" and insert -- of --.

Signed and Sealed this

First Day of October, 2002

*Attest:*

JAMES E. ROGAN
*Attesting Officer*     *Director of the United States Patent and Trademark Office*